US011381381B2

(12) United States Patent
Vald et al.

(10) Patent No.: US 11,381,381 B2
(45) Date of Patent: Jul. 5, 2022

(54) PRIVACY PRESERVING ORACLE

(71) Applicant: INTUIT INC., Mountain View, CA (US)

(72) Inventors: Margarita Vald, Hod Hasharon (IL); Yaron Sheffer, Hod-Hasharon (IL); Yehezkel S. Resheff, Hod Hasharon (IL); Shimon Shahar, Hod Hasharon (IL)

(73) Assignee: INTUIT INC., Mountain View, CA (US)

( * ) Notice: Subject to any disclaimer, the term of this patent is extended or adjusted under 35 U.S.C. 154(b) by 439 days.

(21) Appl. No.: 16/427,549

(22) Filed: May 31, 2019

(65) Prior Publication Data
US 2020/0382273 A1 Dec. 3, 2020

(51) Int. Cl.
*H04L 9/08* (2006.01)
*H04L 9/00* (2022.01)
(Continued)

(52) U.S. Cl.
CPC .............. *H04L 9/008* (2013.01); *G06N 20/00* (2019.01); *H04L 63/0428* (2013.01);
(Continued)

(58) Field of Classification Search
CPC ... H04L 9/08; H04L 63/0428; H04L 2209/46; G06N 20/00; G06N 5/003
See application file for complete search history.

(56) References Cited

U.S. PATENT DOCUMENTS 8,515,058 B1 * 8/2013 Gentry .................... H04L 9/008
380/28
8,565,435 B2 * 10/2013 Gentry .................. H04L 9/0816
713/171
(Continued)

FOREIGN PATENT DOCUMENTS

KR 20180136267 A 12/2018

OTHER PUBLICATIONS

International Search Report issued in corresponding International Patent Application No. PCT/US2019/043889, dated Feb. 27, 2020.
(Continued)

*Primary Examiner* — Ellen Tran
(74) *Attorney, Agent, or Firm* — Patterson + Sheridan, LLP (57) ABSTRACT

Certain aspects of the present disclosure provide techniques for performing computations on encrypted data. One example method generally includes obtaining, at a computing device, encrypted data, wherein the encrypted data is encrypted using fully homomorphic encryption and performing at least one computation on the encrypted data while the encrypted data remains encrypted. The method further includes identifying a clear data operation to perform on the encrypted data and transmitting, from the computing device to a server, a request to perform the clear data operation on the encrypted data, wherein the request includes the encrypted data. The method further includes receiving, at the computing device in response to the request, encrypted output from the server, wherein the encrypted output is of the same size and the same format for all encrypted data transmitted to the server.

20 Claims, 6 Drawing Sheets

(51) Int. Cl.
*H04L 9/40* (2022.01)
*G06N 20/00* (2019.01)

(52) U.S. Cl.
CPC ........ *H04L 63/166* (2013.01); *H04L 2209/08* (2013.01); *H04L 2209/46* (2013.01)

(56) References Cited

U.S. PATENT DOCUMENTS

| | | | | |
|---|---|---|---|---|
| 8,630,422 | B2* | 1/2014 | Gentry | H04L 9/0822 |
| | | | | 713/193 |
| 8,861,716 | B2* | 10/2014 | Halevi | H04L 9/008 |
| | | | | 380/28 |
| 9,083,526 | B2* | 7/2015 | Gentry | H04L 9/008 |
| 9,281,941 | B2* | 3/2016 | Gentry | H04L 63/0442 |
| 10,594,472 | B2* | 3/2020 | Ding | H04L 9/008 |
| 2011/0110525 | A1* | 5/2011 | Gentry | H04L 9/008 |
| | | | | 380/285 |
| 2011/0243320 | A1* | 10/2011 | Halevi | H04L 9/30 |
| | | | | 380/30 |
| 2012/0039473 | A1* | 2/2012 | Gentry | H04L 9/3026 |
| | | | | 380/277 |
| 2013/0170640 | A1 | 7/2013 | Gentry | |
| 2013/0216044 | A1* | 8/2013 | Gentry | H04L 63/0442 |
| | | | | 380/277 |
| 2015/0143112 | A1 | 5/2015 | Yavuz et al. | |
| 2016/0011990 | A1* | 1/2016 | Berengoltz | G06F 12/1433 |
| | | | | 711/152 |
| 2016/0105402 | A1 | 4/2016 | Soon-Shiong et al. | |
| 2016/0191233 | A1 | 6/2016 | Loftus et al. | |
| 2016/0337319 | A1* | 11/2016 | Vaya | H04W 12/02 |
| 2017/0155628 | A1* | 6/2017 | Rohloff | H04L 63/0478 |
| 2018/0048459 | A1* | 2/2018 | Ding | G06F 21/575 |
| 2018/0191692 | A1* | 7/2018 | Frank | H04L 63/0428 |
| 2018/0286143 | A1* | 10/2018 | Deshmukh | G07C 5/006 |
| 2018/0359078 | A1* | 12/2018 | Jain | G06F 21/602 |
| 2020/0136797 | A1* | 4/2020 | Yu | H04L 9/008 |
| 2020/0342331 | A1* | 10/2020 | Takenouchi | G06F 16/285 |

OTHER PUBLICATIONS

Thaine, Patricia, "Homomorphic Encryption for Beginners: A Practical Guide (Part 1)", Dec. 26, 2018, https://medium.com/privacy-preserving-natural-language-processing/homomorphic-encryption-for-beginners-a-practical-guide-part-1-b8f26d03a98a, accessed by web Oct. 15, 2019.

* cited by examiner

PRIVACY PRESERVING ORACLE

INTRODUCTION

Aspects of the present disclosure relate to encrypted data generally and in particular to performing operations over encrypted data.

Given the importance of retaining privacy in data, in most settings private or personal data is encrypted. However, if computations or other operations are to be performed, traditionally encrypted data must be decrypted before the computations may be performed. Some types of encryption, such as Fully Homomorphic Encryption (FHE) make certain operations possible to be performed on encrypted data. However, such encryption systems do not make all types of operations practical to perform (e.g., FHE does not easily allow for division) and even practical operations can only be performed a finite number of times before noise in the encryption prevents subsequent operations from being performed. Thus, systems and methods are needed which preserve the privacy of encrypted data while allowing for more types of operations to be performed, and allowing for any arbitrary number of operations to be performed.

BRIEF SUMMARY

Certain embodiments provide a method for performing computations on encrypted data. The method generally includes obtaining, at a computing device, encrypted data, wherein the encrypted data is encrypted using fully homomorphic encryption and performing at least one computation on the encrypted data while the encrypted data remains encrypted. The method further includes identifying a clear data operation to perform on the encrypted data and transmitting, from the computing device to a server, a request to perform the clear data operation on the encrypted data, wherein the request includes the encrypted data. The method further includes receiving, at the computing device in response to the request, encrypted output from the server, wherein the encrypted output does not leak any information, and in particular is of the same size and the same format for all encrypted data transmitted to the server.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for performing data operations over encrypted data.

One common way to perform operations on encrypted data (such as, for example, performing machine learning operations) is to decrypt the encrypted data, perform the desired operations, and then re-encrypt the data, so that the data is decrypted during use, but encrypted as stored. While this may preserve the privacy of data in some cases, it leaves the data vulnerable to possible attack or disclosure while it is in use, and an entity attempting to breach the data would need only to change its target from the data in storage to the machine learning applications using the data. Further, the device performing the desired operations on the unencrypted data may be running additional applications accessed by multiple individuals or other entities, which increases the exposure of the unencrypted data.

As a result, attention has been drawn to systems of encryption that allow for operations to be performed on data while the data remains encrypted. As discussed above, FHE is one such system. However, in addition to the limitations discussed above, systems such as FHE have an additional drawback, that operations performed over encrypted data are generally more expensive, both in processing resources required and in time required, than operations performed over unencrypted data. Thus, for certain processing-intensive applications, such as machine learning, systems such as FHE are impractical for being too costly.

Discussed herein are systems and methods of performing operations on encrypted data using a privacy preserving server to overcome the limitations of existing methods of performing operations on encrypted data. In general, a system using FHE can employ a secure device (the privacy preserving server) to perform tasks that are not practical to be performed over the FHE-encrypted data while encrypted. To do so, the privacy preserving server decrypts the encrypted data, performs the requested operation while the data is unencrypted, and then returns an encrypted version of the output of the operation. Use of the privacy preserving server to perform a limited set of operations not feasible over encrypted data can overcome the limitations in performing certain machine learning tasks on encrypted data. Additionally, the privacy preserving server can be used to perform operations not feasible over FHE encrypted data, and can be used to re-encrypt FHE data when repeated operations over the data while encrypted raise noise levels above an acceptable threshold.

Consider the following example involving training a tree-based machine learning model. Methods for training such machine learning models usually work top-down, by choosing a variable and a threshold at each level of the tree that best splits the possible subtrees. A common measure for a so-called "best split" is the homogeneity of the target variable within the possible subsets of the tree. However, calculating the best split for a tree-based machine learning model is a processing-intensive calculation, and one that cannot be practically performed over FHE encrypted data. In such an example, the privacy preserving server receives encrypted homogeneity data and a threshold for each variable of the tree, decrypts the data to perform the best split operation, and returns an encrypted vector indicating the best variable to split on, and the re-encrypted value of the split threshold. This is repeated for each node in the tree, to calculate the best split for every node of the tree.

In general, use of a privacy preserving server allows for significant increases in data privacy for machine learning applications which currently decrypt data in order to perform machine learning operations. The use of such a privacy preserving server can eliminate a bottleneck in computation time by shifting the computations that are not feasible over encrypted data to an external trusted component, the privacy preserving server, in a way that preserves full privacy of the data. Additionally, use of a privacy preserving server allows for more efficient use of processing and time resources for machine learning systems or other systems employing encryption. Further, due to the unfeasibility of many operations over FHE encrypted data, use of a privacy preserving server allows for the incorporation of FHE encryption into settings where processing is currently too intensive to allow for use of FHE.

Figure 1:
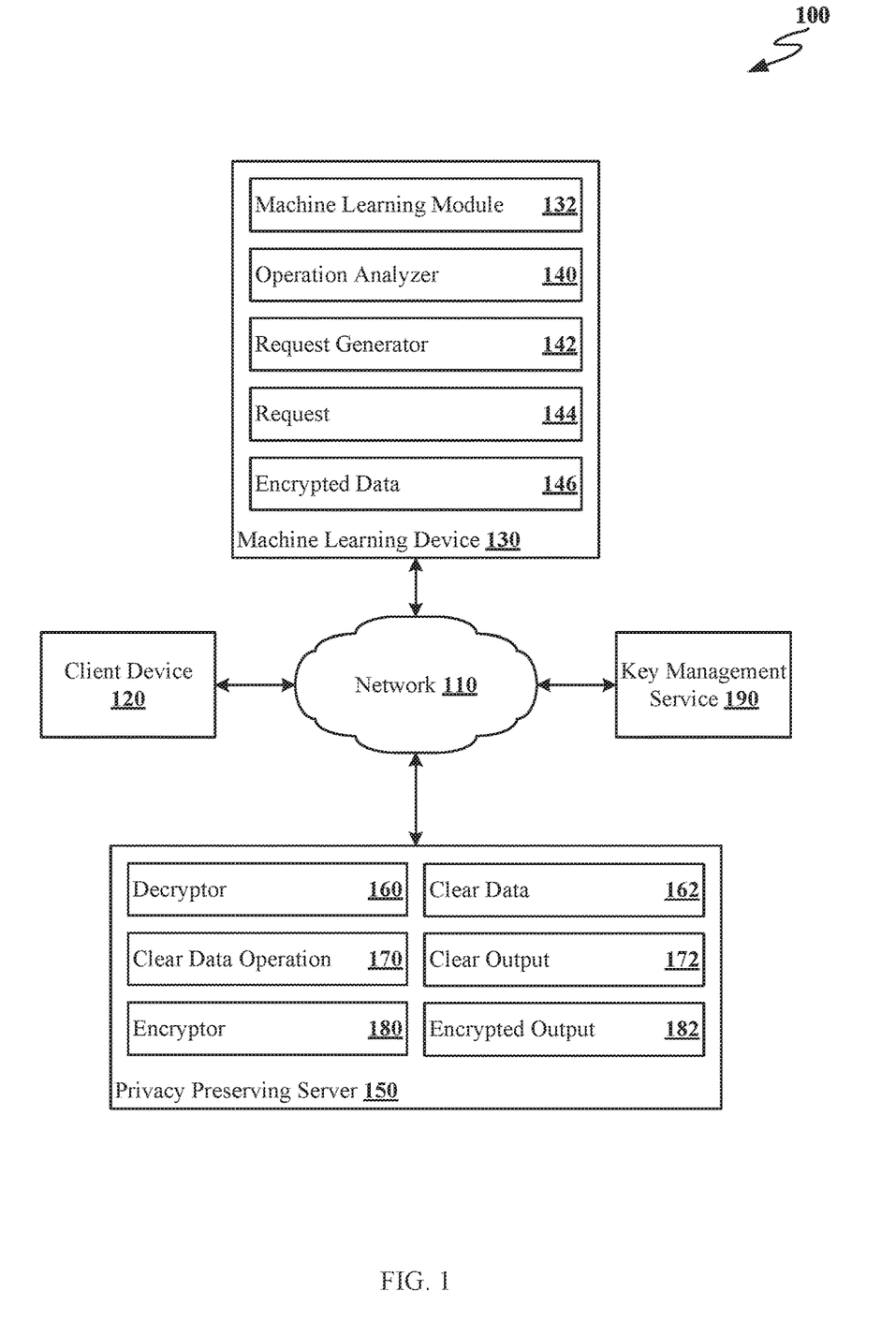
FIG. 1 depicts a computing environment for performing operations over encrypted data, according to one embodiment.

FIG. 1 depicts a computing environment 100 for performing operations over encrypted data, according to one embodiment. Computing environment 100 includes client device 120, machine learning device 130, privacy preserving server 150, and key management service 190, all connected via network 110. The devices of computing environment 100 are shown as distinct entities but in other examples the functions of computing environment 100 may be performed by more or less computing devices or by a distributed or cloud computing system.

Client device 120 is a computing device such as a desktop computer, laptop computer or mobile device including at least a processor and a memory (not shown). In general, client device 120 requests output of a machine learning model from machine learning device 130, such as a predictive result based on input provided by client device 120.

Machine learning device 130 is a computing device including at least a processor and a memory (not shown). Machine learning device 130 is used to perform various tasks related to machine learning. To this end, machine learning device 130 includes machine learning module 132 and encrypted data 146. Machine learning module 132 comprises software routines and data used to train and execute a machine learning model, such as (without limitation): machine learning algorithms, training data, cost optimizers, routines to update machine learning parameters, and trained machine learning models. Machine learning module 132 may be used to train a variety of different types of machine learning models, including tree-based models, neural networks, deep learning models or others. In this example, machine learning module 132 includes a fully trained machine learning model, though in other examples operations performed by machine learning module 132 may include training a machine learning model.

Encrypted data 146 is a set of data encrypted using fully homomorphic encryption, and thus at least some operations are possible over encrypted data 146 without requiring decryption of encrypted data 146. Homomorphic encryption is any form of encryption allowing computation over encrypted data, where both the inputs and output of a particular computation is encrypted. Fully homomorphic encryption refers to homomorphic encryption schemes where all operations are theoretically possible over the data encrypted, although practically speaking some operations may be too complex to be performed over FHE encrypted data in a practical amount of time. There exist several implementations of FHE functionality, or FHE schemes, including the Brakerski-Gentry-Vaikuntanathan (BGV) scheme, the Brakersi/Fan-Vercauteran (BFV) scheme or the Cheon-Kim-Kim-Song (CKKS) scheme.

For example, because operations over FHE encrypted data are more processing and time intensive than operations over plaintext data, some operations are too costly to be feasible over FHE encrypted data. Further, because operations on FHE encrypted data introduce noise in the ciphertext of the FHE encryption, some operations involve so many individual computations that re-encryption (to reset the noise level) would be required before the operation finishes.

In general, to perform machine learning tasks, machine learning module 132 accesses encrypted data 146. In this example, based on the request received from client device 120, machine learning module 132 prepares to execute the machine learning model in response to the request, and thus perform an operation on encrypted data 146. However, because encrypted data 146 is encrypted using FHE encryption, before the operation is performed machine learning device 130 executes operation analyzer 140 to determine if the operation is feasible over encrypted data 146 while encrypted.

To do so, operation analyzer 140 may first assess the noise level of encrypted data 146. If the noise level of encrypted data 146 already exceeds a noise threshold, re-encryption of encrypted data 146 is required before the operation can be performed. If the noise level of encrypted data 146 does not exceed the noise threshold, operation analyzer 140 determines the maximum number of individual computations that may be required by the operation. That is, if the operation may require a number of computations over a computation threshold, the operation is not feasible over encrypted data 146 while encrypted. For example, one common machine learning operation is to identify the maximum value of a set of data. However, over FHE encrypted data this operation may be relatively processing intensive and involves a large number of computations. In such a case, the operation would not be feasible over encrypted data 146 for exceeding the computation threshold.

If operation analyzer 140 determines that the operation is not feasible over encrypted data 146 while encrypted, machine learning device 130 executes request generator 142 to generate request 144. Request generator 142 is a software routine that compiles the data needed by privacy preserving server 150 to perform the operation into request 144. In the case of a re-encryption request, request 144 may include only encrypted data 146 and a key name corresponding to encrypted data 146, to enable decryption by privacy preserving server 150. In the case of an operation not feasible over encrypted data 146 while encrypted, request 144 includes an identifier of the operation as well as encrypted data 146 (or a subset of encrypted data 146 required to perform the operation) and the key name. After generating request 144, request generator 142 transfers request 144 to privacy preserving server 150.

Privacy preserving server 150 is a secure computing device used to perform operations on encrypted data for operations that are not feasible over data while encrypted. In some examples, privacy preserving server 150 may be a representational state transfer (REST) server that responds to hypertext transfer protocol (HTTP) requests. In this example, privacy preserving server 150 accepts request 144 from machine learning device 130, which is a request to perform clear data operation 170 on encrypted data 146.

To perform clear data operation 170, privacy preserving server 150 executes decryptor 160, a software routine used to decrypt FHE encrypted data. To do so, decryptor uses the key name included in request 144 to retrieve a secret key from key management service 190, and decrypts encrypted data 146 to generate clear data 162.

Once encrypted data 146 has been decrypted into clear data 162, privacy preserving server 150 executes clear data operation 170, which outputs clear output 172. In general, to further ensure privacy, the process performed by privacy preserving server 150 is a privacy-preserving operation, meaning that the output of privacy preserving server 150 should be of the same size and format regardless of the input. As an example, consider a non-privacy-preserving operation f(x, y), which returns x if x>0 and otherwise returns (x, y). As can be seen, in this example the length of the output of f(x, y) reveals information about the input to f(x, y), even if that output is encrypted. Thus, privacy preserving server 150 can perform any operation so long as the operation is a privacy-preserving operation.

Because clear output 172 is non-encrypted, it is encrypted before being returned to machine learning device 130. To do so, privacy preserving server 150 executes encryptor 180, a software routine that encrypts clear output 172 into encrypted output 182. Encryptor 180 uses a public key obtained from key management service 190 to encrypt encrypted output 182. After encrypted output 182 is encrypted, privacy preserving server 150 returns encrypted output 182 in response to request 144. If privacy preserving server 150 is a REST server as described, encrypted output 182 may be returned as an HTTP response.

In the case of a request from machine learning device 130 to re-encrypt encrypted data 146, the process performed by privacy preserving server 150 is similar, albeit without performing clear data operation 170. That is, re-encryption may be thought of a special case of execution where clear data operation 170 is a null value. Thus, privacy preserving server 150 accepts the re-encryption request, uses decryptor 160 to produce clear data 162, then uses encryptor 180 to produce encrypted output 182 and return encrypted output to machine learning device 130.

Once machine learning device 130 receives encrypted output 182, the flow of machine learning operation by machine learning module 132 may continue, using encrypted output 182 as the output for the operation. Once machine learning module 132 completes its tasks, the output initially requested by client device 120 may be returned to client device 120.

Figure 2:
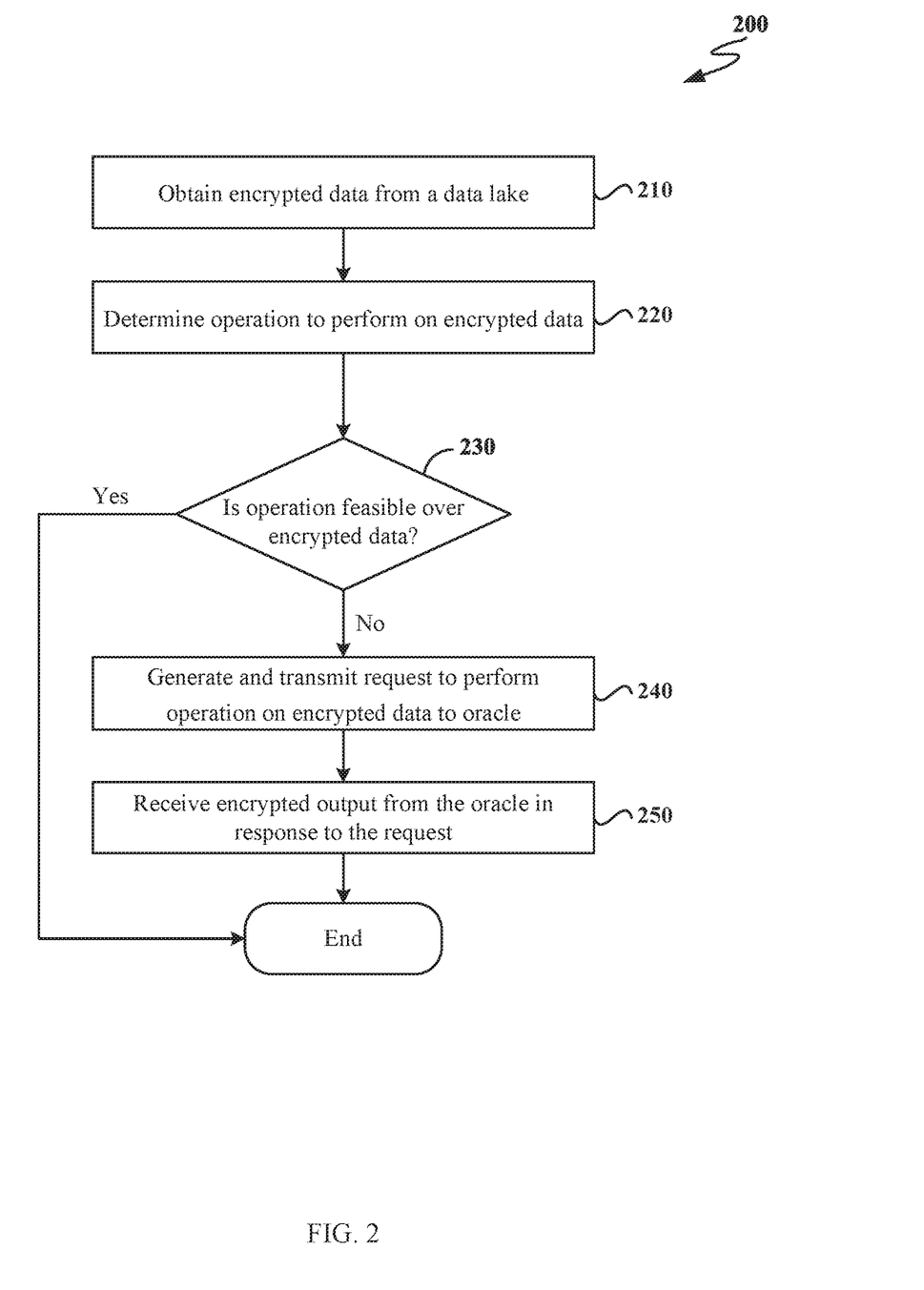
FIG. 2 is a flow chart of example operations for using an privacy preserving server in performing certain data operations.

FIG. 2 is a flow chart of example operations 200 for using an privacy preserving server in performing certain data operations. Operations 200 may be performed by a machine learning device, such as machine learning device 130 of FIG. 1. Operations 200 begin at 210, where the machine learning device obtains encrypted data from a data lake. In general, the machine learning device may operate, with a plurality of other machine learning devices within a data lake of encrypted data. This data lake allows access to the encrypted data to all devices within the data lake, but only provides encrypted data to the devices and may not provide means to decrypt the encrypted data to the devices. Thus, any operation involving decrypting the encrypted data also involves use of an privacy preserving server associated with the data lake.

At 220, the machine learning device determines an operation to perform on the encrypted data. Depending on the application (e.g., machine learning) the operation may be a variety of different computations or combinations of computations. For machine learning, a common operation is identifying a maximum data value (e.g., a vector) within a set of data.

At 230, the machine learning device determines if the operation determined at 220 is feasible over the encrypted data while it remains encrypted. If the computation is feasible, operations 200 end, and the machine learning device performs the operation. If the operation is not feasible, operations 200 advance to 240.

At 240, the machine learning device generates and transmits a request to an privacy preserving server to perform the operation on the encrypted data. Because the operation is highly computationally expensive over encrypted data (and is thus feasible only over clear data), the operation may be called a clear data operation. The request is transmitted to the privacy preserving server because, as described, the machine learning device is not capable of decrypting the encrypted data obtained from the data lake. In general the request includes the encrypted data, an identifier of the operation to be performed, and a key name associated with the encrypted data.

At 250, the machine learning device receives encrypted output from the privacy preserving server in response to the request. In general, between transmission and receipt of the encrypted output, the privacy preserving server decrypts the encrypted data, performs the clear data operation, and encrypts the clear data output of the clear data operation.

Figure 3:
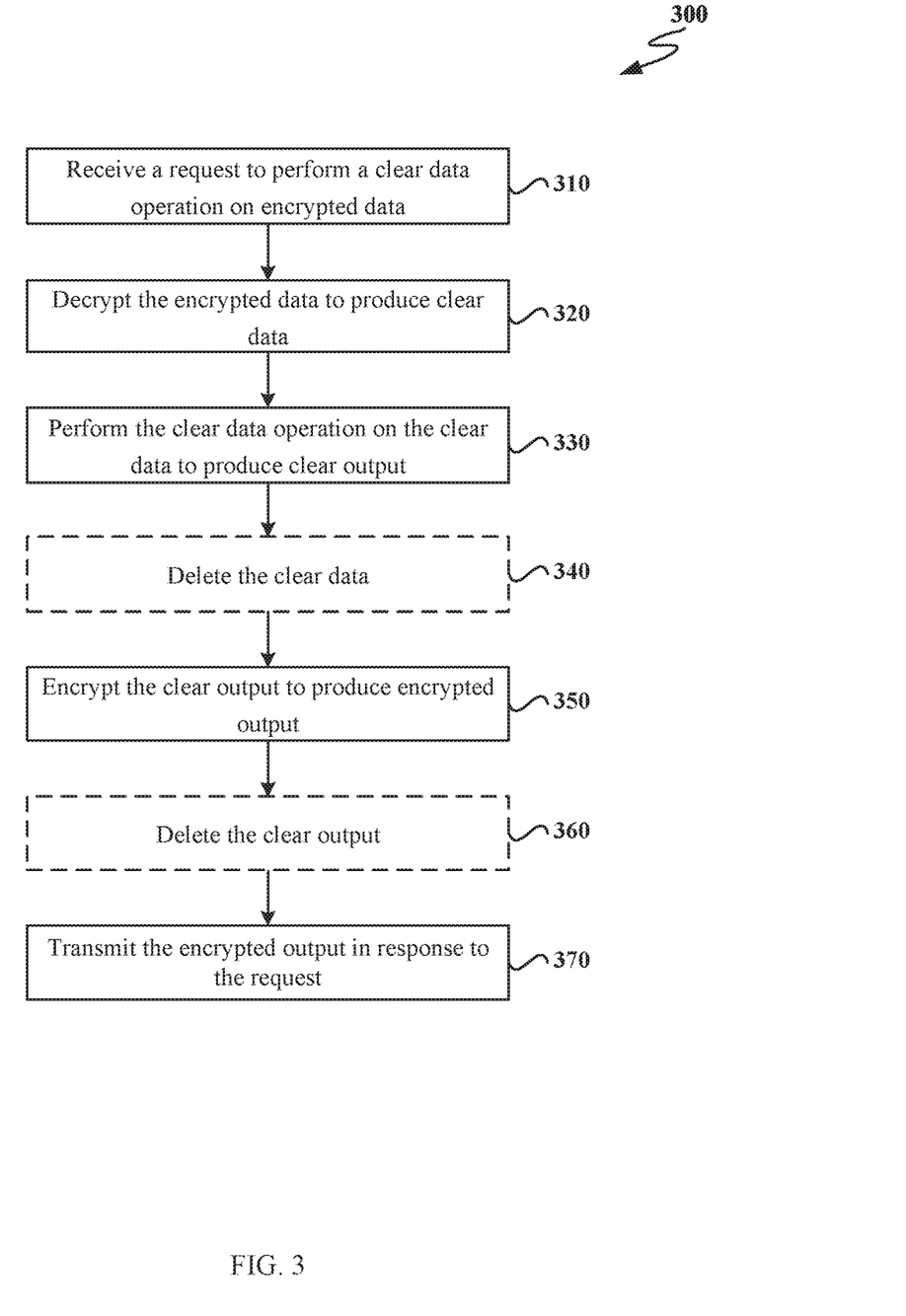
FIG. 3 is a flow chart of example operations for performing clear data operations by an privacy preserving server.

FIG. 3 is a flow chart of example operations 300 for performing clear data operations by an privacy preserving server, such as privacy preserving server 150 of FIG. 1. Operations 300 begin at 310, where the privacy preserving server receives a request to perform a clear data operation on encrypted data. Generally, this request may be received from a machine learning device performing operations such as operations 200 of FIG. 2, although other devices performing other functions may request the privacy preserving server to perform operations on encrypted data.

At 320, the privacy preserving server decrypts the encrypted data to produce clear data. As described above with respect to FIG. 1, the privacy preserving server may access a key management service to obtain a secret key for use in decrypting the encrypted data.

At 330, the privacy preserving server performs the clear data operation on the clear data, producing clear (that is, unencrypted) output. As discussed above, the process performed by the privacy preserving server is a privacy-preserving operation, meaning that the output of the privacy preserving server is of the same size for all possible input to the clear data operation.

In some examples of operations 300, at 340, the privacy preserving server deletes the clear data after performing the clear data operation. In general, because clear data is inherently insecure, the privacy preserving server does not store clear data for longer than necessary to perform the clear data operation. Therefore, once the clear data operation is complete, the privacy preserving server may actively remove the clear data from storage rather than, for example, allowing the clear data to be overwritten by subsequent data storage.

At 350 the privacy preserving server encrypts the clear output to produce encrypted output. The privacy preserving server makes use of a public key obtained from a key management server to encrypt the clear output. Similarly to 340, in some examples of operations 300, at 360, the privacy preserving server deletes the clear output after encryption.

At 370 the privacy preserving server transmits the encrypted output in response to the request. In total, the privacy preserving server can perform the requested operation over the encrypted data and return an encrypted output which reveals nothing about the input to the requested operation. If so, even observations of the transmissions between the privacy preserving server and the machine learning device do not reveal anything about the encrypted data. In this way, data in use on the machine learning device and in transmit from the machine learning device to the privacy preserving server is completely secure, and the machine learning device is capable of performing any privacy-preserving operation on the encrypted data without access to clear data.

Figure 4:
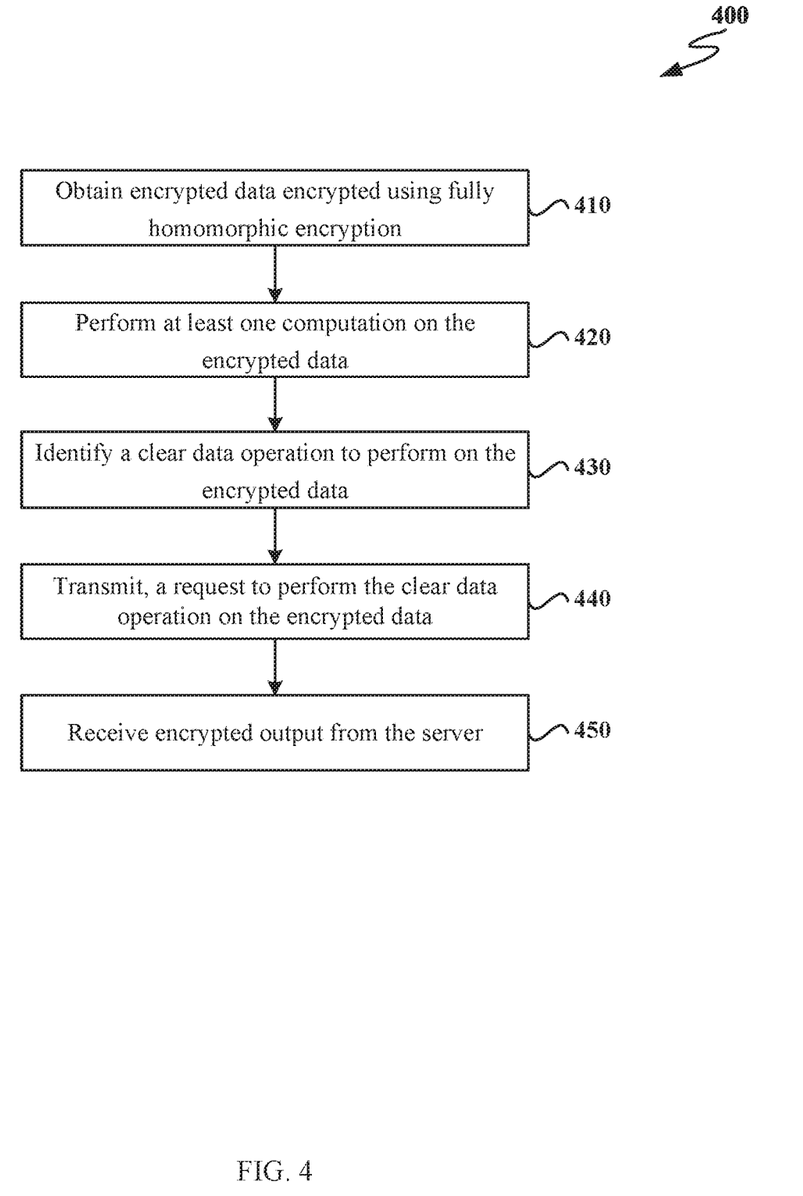
FIG. 4 is a flow chart of an example method for performing computations on encrypted data.

FIG. 4 is a flow chart of an example method for performing computations on encrypted data. Method 400 may be performed by a machine learning device, such as machine learning device 130 of FIG. 1. Method 400 begins at 410, where the machine learning device obtains encrypted data, wherein the encrypted data is encrypted using fully homomorphic encryption.

At 420, the machine learning device performs at least one computation on the encrypted data while the encrypted data remains encrypted. As discussed above, FHE allows for many operations to be performed on encrypted data, but some operations are impractical or infeasible over FHE encrypted data. In this case, the machine learning device identifies an operation which is feasible over the encrypted data and performs it without decrypting the encrypted data.

At 430, the machine learning device identifies a clear data operation to perform on the encrypted data. In contrast to the computation that is feasible at 420, the clear data operation is an operation that is impractical or infeasible over the encrypted data. An operation may be identified as infeasible when the machine learning device determines the operation would exceed a given number of operations threshold, indicating a long computation time, or when the machine learning device determines the operation would cause the encrypted data to exceed a noise threshold, indicating an unacceptable degree of noise in the encrypted data would be present after performing operation.

At 440, the machine learning device transmits, to a server, a request to perform the clear data operation on the encrypted data, wherein the request includes the encrypted data. As discussed above, the server may be an privacy preserving server implemented as a representational state transfer (REST) server available via hypertext transfer protocol (HTTP). In general the privacy preserving server is a secure device associated with a source of the encrypted data, such as a data lake. In some examples, the request may include, in addition to the encrypted data, an identifier of the clear data operation and a key name associated with the encrypted data.

At 450, the machine learning device receives, in response to the request, encrypted output from the server, wherein the encrypted output is of the same size and the same format for all encrypted data transmitted to the server. If the clear data operation does not reveal any information about input based on output, the clear data operation can be said to be a privacy-preserving operation. After receiving the encrypted data the machine learning device may proceed to use the encrypted output, such as in additional computations for a machine learning model.

In some examples of method 400, upon the machine learning transmitting the request, the server receives the request to perform the clear data operation, decrypts the encrypted data to produce clear data, performs the clear data operation on the clear data to produce clear output and encrypts the clear output to produce the encrypted output.

Some examples of method 400 the method further include determining the encrypted data has exceeded a noise threshold, wherein the clear data operation is a null value. In some such examples, the encrypted output comprises re-encrypted data, wherein the re-encrypted data comprises the encrypted data with fresh randomness.

In some examples of method 400 the computing device executes at least one machine learning model. In some such examples, the at least one machine learning model is a tree-based model.

Figure 5:
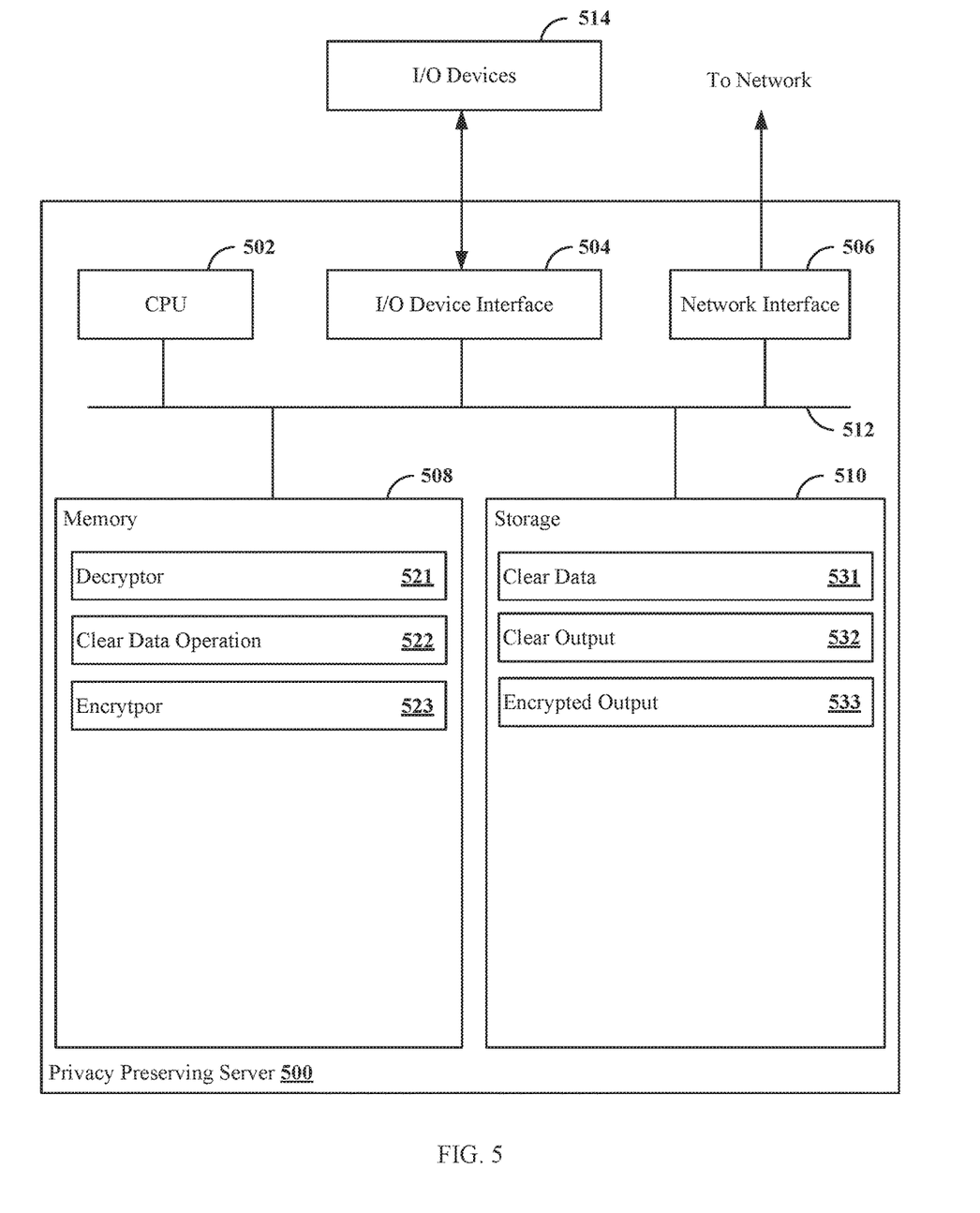
FIG. 5 is a block diagram of example privacy preserving server, according to one embodiment.

FIG. 5 is a block diagram of example privacy preserving server 500, according to one embodiment. As shown, the privacy preserving server 500 includes, without limitation, a central processing unit (CPU) 502, one or more input/output (I/O) device interfaces 504, which may allow for the connection of various I/O devices 514 (e.g., keyboards, displays, mouse devices, pen input, etc.) to privacy preserving server 500, network interface 506, memory 508, storage 510, and an interconnect 512.

The CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. The CPU 502 is included to be representative of a single CPU, multiple CPUs, a single CPU having multiple processing cores, and the like. The I/O device interface 504 may provide an interface for capturing data from one or more input devices integrated into or connected to the privacy preserving server 500, such as keyboards, mice, touchscreens, and so on. The memory 508 may represent a random access memory (RAM), while the storage 510 may be a solid state drive, for example. Although shown as a single unit, the storage 510 may be a combination of fixed and/or removable storage devices, such as fixed drives, removable memory cards, network attached storage (NAS), or cloud-based storage.

As shown, the memory 508 includes decryptor 521, clear data operation 522 and encryptor 523, which are software routines executed based on instructions stored in the storage 510. Such instructions may be executed by the CPU 502.

As shown, the storage 510 includes clear data 531, clear output 532 and encrypted output 533. In general, privacy preserving server 500 receives a request to perform clear data operation 522 on a set of encrypted data, such as via network interface 506. To do so, decryptor 521 decrypts the encrypted data into clear data 531. Then, clear data operation 522 accepts clear data 531 as input and outputs clear output 532. Then, encryptor 523 encrypts clear output 532 into encrypted output 533. Privacy preserving server 500 then transmits encrypted output 533 over network interface 506 in response to the request.

Figure 6:
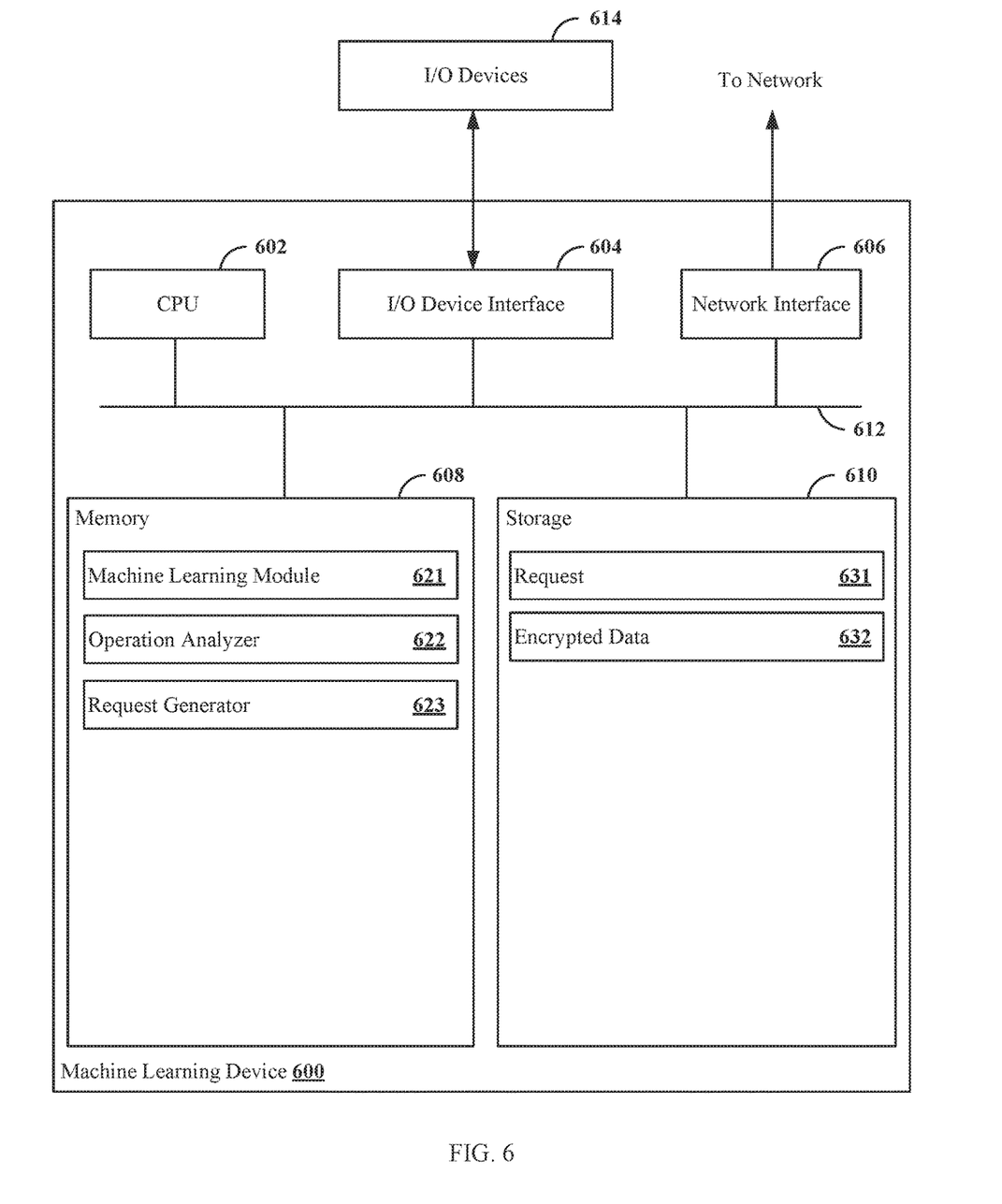
FIG. 6 is a block diagram of example machine learning device, according to one embodiment.

FIG. 6 is a block diagram of example machine learning device 600, according to one embodiment. As shown, the machine learning device 600 includes, without limitation, a central processing unit (CPU) 602, one or more input/output (I/O) device interfaces 604, which may allow for the connection of various I/O devices 614 (e.g., keyboards, displays, mouse devices, pen input, etc.) to machine learning device 600, network interface 606, memory 608, storage 610, and an interconnect 612.

The CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. The CPU 602 is included to be representative of a single CPU, multiple CPUs, a single CPU having multiple processing cores, and the like. The I/O device interface 604 may provide an interface for capturing data from one or more input devices integrated into or connected to the machine learning device 600, such as keyboards, mice, touchscreens, and so on. The memory 608 may represent a random access memory (RAM), while the storage 610 may be a solid state drive, for example. Although shown as a single unit, the storage 610 may be a combination of fixed and/or removable storage devices, such as fixed drives, removable memory cards, network attached storage (NAS), or cloud-based storage.

As shown, the memory 608 includes machine learning module 621, operation analyzer 622 and request generator 623, which are software routines executed based on instructions stored in the storage 610. Such instructions may be executed by the CPU 602.

As shown, the storage 610 includes request 631 and encrypted data 632. In general, machine learning module 621 uses encrypted data 632 to perform various machine learning tasks. Before individual operations of machine learning module 621 are performed, operation analyzer 622 analyzes the operations for feasibility over encrypted data 632. If operation analyzer 622 determines at least one operation of machine learning module 621 is not feasible over encrypted data 632, or if operation analyzer 622 determines encrypted data 632 has exceeded a noise threshold, request generator 623 generates request 631 to perform an operation on encrypted data 632. Once request 631 is generated request generator may transmit request 631 to an privacy preserving server, such as via network interface 606. Thereafter machine learning device 600 receives encrypted output from the privacy preserving server in response to the request.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for performing computations on encrypted data, comprising:
    obtaining, at a computing device, encrypted data, wherein the encrypted data is encrypted using fully homomorphic encryption;
    performing a first operation on the encrypted data while the encrypted data remains encrypted;
    determining that a second operation is not feasible over the encrypted data while the encrypted data remains encrypted;
    transmitting, from the computing device to a server, a request, including the encrypted data, to decrypt the encrypted data and to perform the second operation on the encrypted data after decryption; and
    receiving, at the computing device in response to the request, encrypted output from the server, wherein the encrypted output is of a same size and a same format as the encrypted data transmitted to the server with the request.

2. The method of claim 1, wherein, determining that the second operation is not feasible over the encrypted data while the encrypted data remains encrypted comprises determining that performing the second operation on the computing device exceeds a computation threshold.

3. The method of claim 1, wherein, determining that the second operation is not feasible over the encrypted data while the encrypted data remains encrypted comprises determining that performing the second operation on the computing device exceeds a noise threshold.

4. The method of claim 1, wherein the second operation comprises producing clear data and an encrypted output, wherein the encrypted output is returned to the computing device.

5. The method of claim 4, wherein the encrypted output comprises re-encrypted data, wherein the re-encrypted data comprises the encrypted data with renewed randomness.

6. The method of claim 1, wherein the first operation comprises using a machine learning model to perform a machine learning task on the encrypted data.

7. The method of claim 6, wherein the machine learning model is a tree-based model.

8. The method of claim 1, wherein the server is a privacy preserving server comprising a representational state transfer (REST) server available via hypertext transfer protocol (HTTP).

9. A computing device including:
    a processor; and
    a memory including computer readable instructions, wherein the processor is configured to, based on execution of the computer readable instructions:
        obtain, at the computing device, encrypted data, wherein the encrypted data is encrypted using fully homomorphic encryption;
    perform a first operation on the encrypted data while the encrypted data remains encrypted;
        determine that a second operation is not feasible over the encrypted data while the encrypted data remains encrypted;

transmit, from the computing device to a server, a request, including the encrypted data, to decrypt the encrypted data and to perform the second operation on the encrypted data after decryption; and receive, at the computing device in response to the request, encrypted output from the server, wherein the encrypted output is of a same size and a same format as the encrypted data transmitted to the server with the request.

10. The computing device of claim 9, wherein, the processor is further configured to:

while identifying the second operation to perform on the encrypted data, determine that performing the second operation on the computing device exceeds a computation threshold.

11. The computing device of claim 9, wherein, the processor is further configured to:

while identifying the second operation to perform on the encrypted data, determine that performing the second operation on the computing device exceeds a noise threshold.

12. The computing device of claim 9, wherein the second operation comprises producing clear data and an encrypted output, wherein the encrypted output is returned to the computing device.

13. The computing device of claim 12, wherein the encrypted output comprises, re-encrypted data, wherein the re-encrypted data comprises the encrypted data with renewed randomness.

14. The computing device of claim 9, wherein the first operation comprises using a machine learning model to perform a machine learning task on the encrypted data.

15. The computing device of claim 14, wherein the machine learning model is a tree-based model.

16. The computing device of claim 9, wherein the server is a privacy preserving server comprising a representational state transfer (REST) server available via hypertext transfer protocol (HTTP).

17. A method for performing computations by a privacy preserving server, comprising:

receiving a request from a device to perform an operation that is not feasible over encrypted data, wherein:
the encrypted data is encrypted using fully homomorphic encryption, and
the request includes an identifier of the operation that is not feasible over the encrypted data, the encrypted data, and a key name;

decrypting the encrypted data to produce clear data;

performing the operation that is not feasible over the encrypted data on the clear data to produce clear output;

deleting the clear data;

encrypting the clear output to produce an encrypted output;

deleting the clear output; and transmitting, in response to the request, the encrypted output to the device.

18. The method of claim 17, wherein the operation that is not feasible over the encrypted data comprises producing clear data and an encrypted output, wherein the encrypted output is returned to the device.

19. The method of claim 18, wherein the encrypted output comprises, re-encrypted data, wherein the re-encrypted data comprises the encrypted data with renewed randomness.

20. The method of claim 17, the privacy preserving server is a representational state transfer (REST) server available to the device via hypertext transfer protocol (HTTP).

* * * * *